C. L. MITCHELL.
HAT PIN GUARD.
APPLICATION FILED JAN. 19, 1911.
1,001,210.
Patented Aug. 22, 1911.
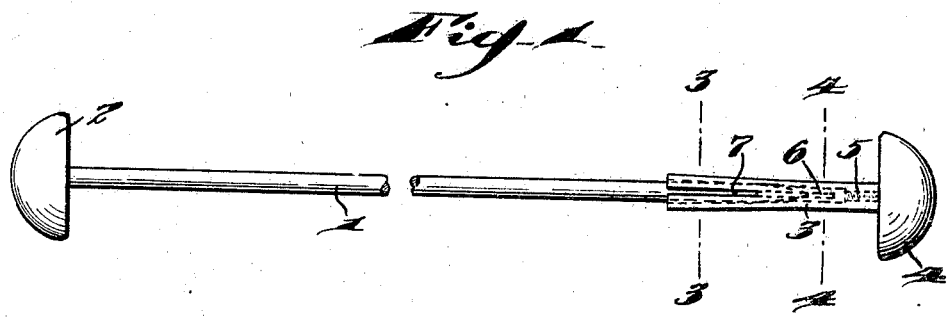
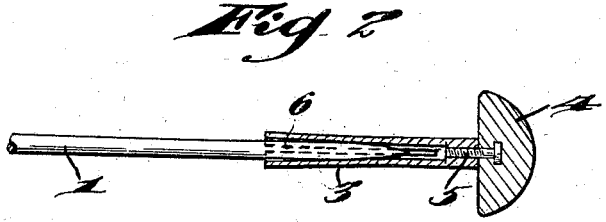
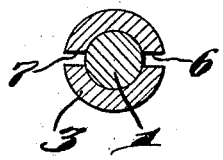
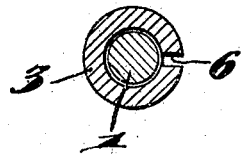
Witnesses
Thro. Rosemann
R. H. Krenkel.
Inventor
Charles L. Mitchell,
By Joshua R. H. Potts.
Attorney

UNITED STATES PATENT OFFICE.

CHARLIES L. MITCHELL, OF PHILADELPHIA, PENNSYLVANIA.

HAT-PIN GUARD.

1,001,210.

Specification of Letters Patent. Patented Aug. 22, 1911.

Application filed January 19, 1911. Serial No. 603,423.

*To all whom it may concern:*

Be it known that I, CHARLIES L. MITCHELL, a citizen of the United States, residing at Philadelphia, in the county of Philadelphia and State of Pennsylvania, have invented certain new and useful Improvements in Hat-Pin Guards, of which the following is a specification.

My invention relates to improvements in hat pin guards, the object of the invention being to provide improved means for protecting the point of the pin, preventing accidents and rendering easy the placing in position of the guard and removal of the guard, yet holding securely when in place.

A further object is to provide an improved hat pin guard which clamps upon the pin, and which if a strain is had upon the pin to withdraw it from the hat will allow the escape of the pin without injuring the hat.

A further object is to provide a device of this kind of extreme simplicity, cheapness to manufacture and which can be used with any form of hat pin.

With these and other objects in view, the invention consists in certain novel features of construction and combinations and arrangements of parts, as will be more fully hereinafter described and pointed out in the claim.

In the accompanying drawings: Figure 1, is a broken view in elevation illustrating my improvements. Fig. 2, is a view in longitudinal section. Fig. 3, is an enlarged view in section on the line 3—3 of Fig. 1, and Fig. 4, is an enlarged view in section on the line 4—4 of Fig. 1.

1, represents an ordinary hat pin having any ordinary head 2 at its other end.

3, represents my improved guard which is in the form of a tube of spring metal having a head 4 thereon which may if desired correspond with the head 2, and said head 4 may be fixed to the tube or removable therefrom as desired. One form of removable head is shown in which the head is provided with a screw-threaded shank 5 to screw into the threaded end of tube 3. Tube 3 is provided at opposite sides with slots 6 and 7 respectively, which extend to the free end of the tube. It will be noted that the slot 6 is appreciably longer than the slot 7, and herein lies the most essential feature of my invention. By reason of these slots, the metal between the slots comprises spring clamping jaws which, due to the different lengths of slot, not only exert a transverse clamping action, but also a torsional one. The strength of the spring is increased over a device having slots of a length equal to the length of the longer slot, and the action is different from the action of a tube having slots of the same length.

It is simply necessary to insert the pointed end of the pin 1 into the tubular guard and force the latter onto the pin when the guard will securely clamp itself in place. If a pull is had on the pin before the guard is removed, the contact with the guard with the hat will enable the pin to be drawn out of the guard and not injure the hat as would be the case if the connection were in any sense a permanent one, but the torsional spring action of the tube is sufficient to maintain the guard in place without any danger of accidental movement.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A hat pin guard comprising a clamping member consisting solely of a tube of spring metal having longitudinally disposed diametrically opposite slots extending from one end thereof, said slots being of different lengths and both slots being of a width appreciably less than the internal diameter of the tube, substantially as described.

In testimony whereof I have signed my name to this specification in the presence of two subscribing witnesses.

CHARLIES L. MITCHELL.

Witnesses:
R. H. KRENKEL,
CHAS. E. POTTS.